United States Patent
Mizuno et al.

(10) Patent No.: US 10,222,281 B2
(45) Date of Patent: Mar. 5, 2019

(54) FORCE DETECTION APPARATUS HAVING HIGH SENSOR SENSITIVITY

(71) Applicant: DENSO CORPORATION, Kariya, Aichi-pref. (JP)

(72) Inventors: Kentaro Mizuno, Nagakute (JP); Rie Taguchi, Nagakute (JP); Shoji Hashimoto, Nagakute (JP); Yoshie Ohira, Nagakute (JP); Takashi Katsumata, Kariya (JP); Kouhei Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 15/128,453

(22) PCT Filed: Mar. 24, 2015

(86) PCT No.: PCT/JP2015/001670
§ 371 (c)(1),
(2) Date: Sep. 23, 2016

(87) PCT Pub. No.: WO2015/146154
PCT Pub. Date: Oct. 1, 2015

(65) Prior Publication Data
US 2017/0102274 A1    Apr. 13, 2017

(30) Foreign Application Priority Data

Mar. 26, 2014  (JP) .................................. 2014-063198
Jun. 12, 2014  (JP) .................................. 2014-121824
Mar. 9, 2015   (JP) .................................. 2015-045682

(51) Int. Cl.
*G01L 1/18*  (2006.01)
*G01L 9/00*  (2006.01)
*G01L 9/06*  (2006.01)

(52) U.S. Cl.
CPC .............. *G01L 1/18* (2013.01); *G01L 9/0054* (2013.01); *G01L 9/0055* (2013.01); *G01L 9/06* (2013.01)

(58) Field of Classification Search
CPC ....... G01L 1/18; G01L 1/2231; G01L 9/0054; G01L 9/06; G01L 9/0055
(Continued)

(56) References Cited

U.S. PATENT DOCUMENTS 5,773,728 A    6/1998  Tsukada et al.
7,644,623 B2 *  1/2010  Yokura .................... G01K 5/52
                                                  73/726

(Continued)

FOREIGN PATENT DOCUMENTS

JP    2001-304997 A    10/2001
JP    2004-132811 A     4/2004
(Continued)

*Primary Examiner* — Jonathan Dunlap
*Assistant Examiner* — Octavia Hollington
(74) *Attorney, Agent, or Firm* — Posz Law Group, PLC

(57) ABSTRACT

A force detection apparatus includes a substrate and a force transmission block. The substrate includes: a high-sensitive mesa gauge that is provided on a main surface, extends in a first direction to produce a relatively large change of an electric resistance in accordance with compressive stress, and includes a top surface; a low-sensitive mesa gauge that is provided on the main surface, extends in a second direction to produce a relatively small change of an electric resistance, and includes a top surface; and a mesa lead that is provided on the main surface, extends in a third direction, and includes a top surface. The force transmission block contacts the top surface of the high-sensitive mesa gauge and the top surface of the low-sensitive mesa gauge, and is non-contact with at least a part of the top surface of the mesa lead.

8 Claims, 12 Drawing Sheets

(58) Field of Classification Search
USPC .................................................. 73/862.627
See application file for complete search history.

(56) References Cited

U.S. PATENT DOCUMENTS 9,032,818 B2 * 5/2015 Campbell ............... G01L 1/148
73/862.628
2018/0024014 A1 * 1/2018 Taguchi .................... G01L 1/18

FOREIGN PATENT DOCUMENTS

JP       2006-058266 A     3/2006
JP       2007-263766 A    10/2007

* cited by examiner

FORCE DETECTION APPARATUS HAVING HIGH SENSOR SENSITIVITY

CROSS REFERENCE TO RELATED APPLICATIONS

The present application is the U.S. national phase of International Patent Application No. PCT/JP2015/001670 filed on Mar. 24, 2015 and is based on Japanese Patent Application No. 2014-121824 filed on Jun. 12, 2014, Japanese Patent Application No. 2014-63198 filed on Mar. 26, 2014, and Japanese Patent Application No. 2015-45682 filed on Mar. 9, 2015, the disclosures of which are incorporated herein by reference.

TECHNICAL FIELD

The present disclosure relates to a force detection apparatus utilizing a piezoresistance effect.

BACKGROUND ART

A force detection apparatus utilizing a piezoresistance effect has been developed, and an example is disclosed in Patent Literature 1. This type of force detection apparatus includes a substrate and a force transmission block. A mesa gauge configuring a bridge circuit is provided on a main surface of the substrate. For example, the mesa gauge configuring the bridge circuit is disposed in correspondence with sides of a rectangle. The mesa gauge includes a high-sensitive mesa gauge extending in a direction to produce a relatively large change of an electric resistance in accordance to compressive stress, and a low-sensitive mesa gauge extending in a direction producing a relatively small change of an electric resistance in accordance to compressive stress. A mesa lead is further provided on the main surface of the substrate. The mesa lead extends from a connection portion connecting the high-sensitive mesa gauge and the low-sensitive mesa gauge.

The force transmission block is provided so as to cover the high-sensitive mesa gauge, the low-sensitive mesa gauge and the mesa lead, provided on the main surface of the substrate, and to contact a top surface of the high-sensitive mesa gauge, a top surface of the low-sensitive mesa gauge, and a top surface of the mesa lead. When the force transmission block presses the high-sensitive mesa gauge, compressive stress applied to the high-sensitive mesa gauge increases. In this case, electric resistance of the high-sensitive mesa gauge changes by a piezoresistance effect. Force applied to the force transmission block is detected based on the change of the electric resistance.

A force detection apparatus utilizing a piezoresistance effect has been developed. This type of force detection apparatus includes a substrate and a force transmission block. A mesa gauge configuring a bridge circuit is provided on a main surface of the substrate. The force transmission block contacts a top surface of the mesa gauge. When the force transmission block presses the mesa gauge, compressive stress applied to the mesa gauge increases. In this case, electric resistance of the mesa gauge changes by a piezoresistance effect. Force applied to the force transmission block is detected based on the change of the electric resistance.

Each of Patent Literature 2 and Patent Literature 3 discloses a sealed force detection apparatus. The sealed force detection apparatus is characterized by a configuration of a force transmission block connected to a main surface of a substrate around the entire circumference of a mesa gauge.

PRIOR ART LITERATURES

Patent Literatures

Patent Literature 1: JP 2001-304997 A
Patent Literature 2: JP 2004-132811 A
Patent Literature 3: JP 2006-058266 A

SUMMARY OF INVENTION

The inventors of the present application have found the following regarding a force detection apparatus.

Improvement of sensor sensitivity is desired for this type of force detection apparatus. It is an object of the present disclosure is to provide a technology to improve sensor sensitivity of a force detection apparatus.

The inventors of the present application have also found the following regarding a force detection apparatus.

When a sealed force detection apparatus becomes compact, a pressure receiving area of a force transmission block included in the sealed force detection apparatus decreases. In this case, compressive stress applied to a mesa gauge decreases accordingly. Thud sensor sensitivity of the force detection apparatus is reduced. It is an object of the present disclosure to provide a sealed force detection apparatus having high sensor sensitivity.

According to a force detection apparatus of a first aspect of the present disclosure, a force detection apparatus includes a substrate; and a force transmission block. The substrate includes: a high-sensitive mesa gauge that is provided on a main surface, extends in a first direction to produce a relatively large change of an electric resistance in accordance with compressive stress, and includes a top surface; a low-sensitive mesa gauge that is provided on the main surface, extends in a second direction to produce a relatively small change of an electric resistance in accordance with compressive stress, and includes a top surface; and a mesa lead that is provided on the main surface, extends in a third direction from a connection portion connecting the high-sensitive mesa gauge and the low-sensitive mesa gauge, and includes a top surface. The force transmission block contacts the top surface of the high-sensitive mesa gauge and the top surface of the low-sensitive mesa gauge, and is non-contact with at least a part of the top surface of the mesa lead.

According to a force detection apparatus of another aspect of the present disclosure, a force detection apparatus includes a substrate, and a force transmission block. The substrate includes: a high-sensitive mesa gauge that is provided on a main surface, extends in a first direction to produce a relatively large change of an electric resistance in accordance with compressive stress, and includes a top surface; a low-sensitive mesa gauge that is provided on the main surface, extends in a second direction to produce a relatively small change of an electric resistance in accordance with compressive stress, and includes a top surface; and a mesa lead that is provided on the main surface, extends in a third direction from a connection portion connecting the high-sensitive mesa gauge and the low-sensitive mesa gauge, and includes a top surface. The force transmission block only contacts the top surface of the high-sensitive mesa gauge, and is non-contact with the low-sensitive mesa gauge.

According to the force detection apparatus in the present embodiment, the force transmission block does not contact at least a part of the top surface of the mesa lead. Thus force received by the force transmission block is efficiently transmitted to the high-sensitive mesa gauge. Accordingly, it may be possible to improve sensor sensitivity of the force detection apparatus.

According to a force detection apparatus of a second aspect of the present disclosure, a force detection apparatus includes a substrate; and a force transmission block. The substrate includes: a mesa gauge that is provided on a main surface, contacts the force transmission block, and configures a bridge circuit; a sealing portion that is provided on the main surface and contacts the force transmission block around an entire circumference of the mesa gauge; and a support that is provided on the main surface, disposed in an inner area surrounded by the mesa gauge, and contacts the force transmission block.

According to the force detection apparatus in the present embodiment, the sealed space is formed between the substrate and the force transmission block. When force applied to the force transmission block increases, the force transmission block bends within the sealed space toward the substrate side. In this case, a leverage relationship which defines the bended and deformed portion of the force transmission block as the point of power, the support as the fulcrum, and the mesa gauge as the point of action is satisfied. In this case, since compressive stress applied to the mesa gauge becomes large based on the leverage relationship defining the mesa gauge as the point of action, it may be possible to improve sensor sensitivity of the force detection apparatus.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION

Figure 1:
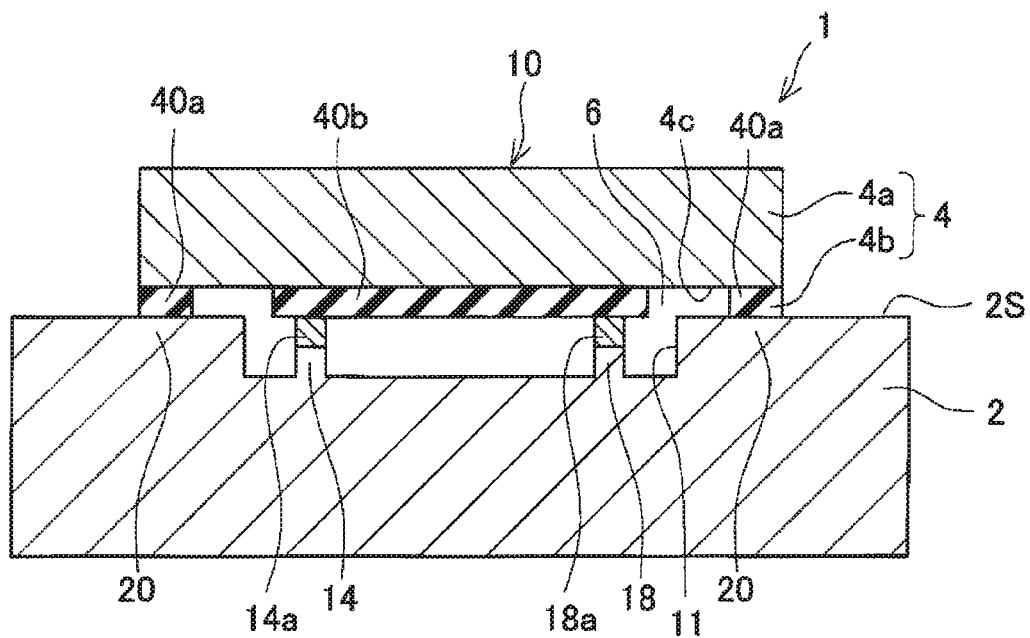
FIG. 1 is a diagram illustrating a schematic cross-sectional view of a force detection apparatus according to an example, taken along a line I-I in FIG. 3.

A feature of a technology disclosed in this description will be hereinafter sequentially described. Each of matters described herein produces independent technical advantages.

(First Embodiment)

One embodiment of a force detection apparatus disclosed in the present description is a sensor for detecting various types of pressures. A detection target may be an air pressure or a liquid pressure, for example. The force detection apparatus may include a substrate and a force transmission block. It is preferable that the substrate is made of material which changes an electric resistance in accordance with compressive stress by a piezoresistance effect. For example, the substrate may be provided by a semiconductor substrate or an SOI substrate. The substrate may include a high-sensitive mesa gauge, a low-sensitive mesa gauge, and a mesa lead. The high-sensitive mesa gauge is provided on a main surface of the substrate, and includes a top surface. The high-sensitive mesa gauge extends in a first direction to produce a relatively large change of an electric resistance in accordance with compressive stress. The low-sensitive mesa gauge is provided on the main surface of the substrate, and includes a top surface. The low-sensitive mesa gauge extends in a second direction to produce a relatively small change of an electric resistance in accordance with compressive stress. The first direction and the second direction cross each other. In a typical example, the high-sensitive mesa gauge and the low-sensitive mesa gauge may form a bridge circuit. In this case, a pair of the high-sensitive mesa gauges may be disposed in correspondence with an opposed pair of sides of a rectangle, while a pair of the low-sensitive mesa gauges may be disposed in correspondence with the other opposed pair of sides of the rectangle. The term "relatively" in this context expresses a condition of comparison between the high-sensitive mesa gauge and the low-sensitive mesa gauge. In other words, an electric resistance of the high-sensitive mesa gauge produces a larger change in accordance with compressive stress than an electric resistance of the low-sensitive mesa gauge. The mesa lead is provided on the main surface of the substrate, and includes a top surface. The mesa lead extends in a third direction from a connection portion connecting the high-sensitive mesa gauge and the low-sensitive mesa gauge. The third direction may cross both the first direction and the second direction, or extend in parallel with either one of the first direction and the second direction. The force transmission block contacts the top surface of the high-sensitive mesa gauge and the top surface of the low-sensitive mesa gauge. The force transmission block does not contact at least a part of the top surface of the mesa lead. In other words, the force transmission block is brought into a non-contact state at least from a part of the top surface of the mesa lead. It is preferable that the force transmission block does not contact the top surface of the mesa lead.

According to the force detection apparatus of this embodiment, the contact area of the force transmission block to the top surface of the high-sensitive mesa gauge may be larger than the contact area of the force transmission block to the top surface of the low-sensitive mesa gauge. In this force detection apparatus, since the contact area of the force transmission block to the high-sensitive mesa gauge are different from the contact area of the force transmission block to the low-sensitive mesa gauge, a large quantity of force received by the force transmission block can be transmitted to the high-sensitive mesa gauge. According to this structure, compressive stress applied to the high-sensitive mesa gauge increases, and therefore sensor sensitivity of the force detection apparatus improves. There may be a configuration which only allows contact between the force transmission block and the top surface of the high-sensitive mesa gauge in order to increase sensor sensitivity of the force detection apparatus. However, in the force detection apparatus having this configuration, the force transmission block is not supported by the low-sensitive mesa gauge. When the force transmission block bends toward the substrate side, the high-sensitive mesa gauge deforms one-sidedly, so that linearity between compressive stress and electric resistances may deteriorate. When the force transmission block contacts both the top surface of the high-sensitive mesa gauge and the top surface of the low-sensitive mesa gauge, the bend of the force transmission block and the one-sided deformation of the high-sensitive mesa gauge decrease. Accordingly, linearity between compressive force and electric resistances improves. According to the force detection apparatus of this embodiment, sensor sensitivity and linearity both may improve.

According to the force detection apparatus of this embodiment, the force transmission block may include multiple plurality parts disposed away from each other in the second direction. In this case, each of the plurality parts may contact the top surface of the low-sensitive mesa gauge. According to the force detection apparatus of this embodiment, a bend of the force transmission block decreases, and therefore both the sensor sensitivity and the linearity improve.

The low-sensitive mesa gauge may include a central region extending in the second direction in the vicinity of the center of the low-sensitive mesa gauge, and a peripheral region extending in the second direction from the connection portion toward the central region. According to the force detection apparatus including multiple plurality parts in the force transmission block, each of which plurality parts contacts the top surface of the low-sensitive mesa gauge, an area contacting between the plurality parts and the central region may be larger than an area of contact between the plurality parts and the peripheral region. According to the force detection apparatus of this embodiment, it may be possible to effectively reduce the bend of the force transmission block while decreasing the contact area between the force transmission block and the low-sensitive mesa gauge. Accordingly, sensor sensitivity and linearity of the force detection apparatus of this embodiment further improves.

The low-sensitive mesa gauge may include a central region extending in the second direction in the vicinity of the center of the low-sensitive mesa gauge, and a peripheral region extending in the second direction from the connection portion toward the central region. According to the force detection apparatus including the plurality parts in the force transmission block, each of which plurality parts contacts the top surface of the low-sensitive mesa gauge, the plurality parts disposed in correspondence with the central region may be provided more densely than the plurality parts disposed in correspondence with the peripheral region. According to the force detection apparatus of this embodiment, it may be possible to effectively reduce the bend of the force transmission block while decreasing the contact area between the force transmission block and the low-sensitive mesa gauge. Accordingly, both sensor sensitivity and linearity of the force detection apparatus of this embodiment further improves.

(First Example)

Figure 2:
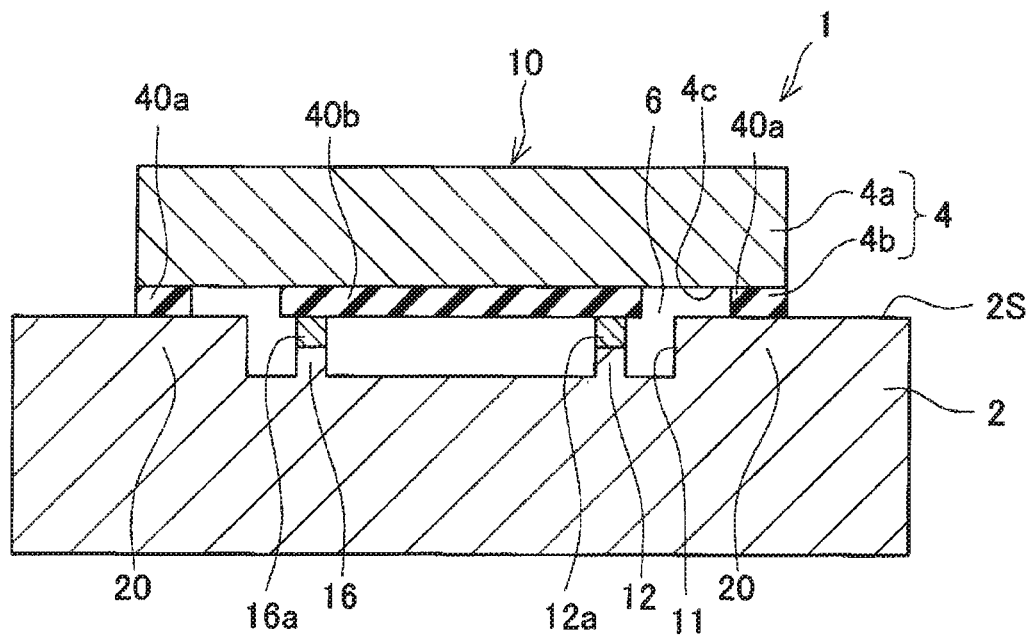
FIG. 2 is a diagram illustrating a schematic cross-sectional view of the force detection apparatus according to the example, taken along a line II-II in FIG. 3.
Figure 3:
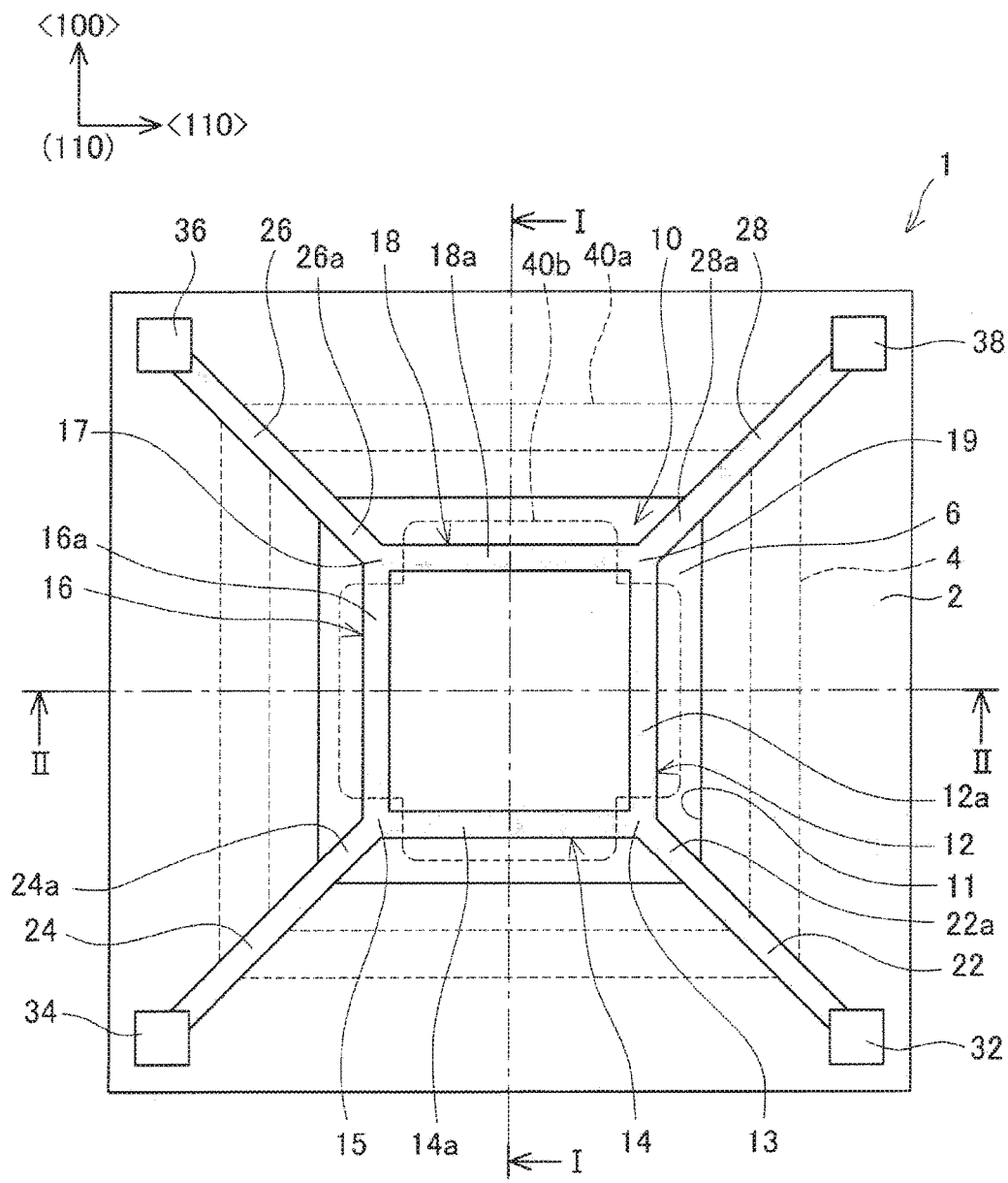
FIG. 3 is a diagram illustrating a schematic plan view of a substrate of the force detection apparatus according to the example, illustrating with a broken line a range of contact with a force transmission block.

As illustrated in FIG. 1 to FIG. 3, a force detection apparatus 1 is, for example, a semiconductor pressure sensor detecting a vessel internal pressure of a pressure vessel. The force detection apparatus 1 includes a semiconductor substrate 2 and a force transmission block 4.

As illustrated in FIG. 1 and FIG. 2, the semiconductor substrate 2 is made of n-type single crystal silicon, including a main surface 2S constituted by a (110) crystal surface. Multiple grooves 11 are formed in the main surface 2S of the semiconductor substrate 2. The multiple grooves 11 define a detection portion 10 in the main surface 2S of the semiconductor substrate 2.

As illustrated in FIG. 3, the detection portion 10 includes mesa gauges 12, 14, 16, and 18 configuring a bridge circuit. As illustrated in FIG. 1 and FIG. 2, each of the mesa gauges 12, 14, 16, and 18 protrudes in a mesa shape from the bottom of the corresponding groove 11. Each height of the mesa gauges 12, 14, 16, and 18 ranges approximately from 0.5 μm to 5 μm. Each top surface of the mesa gauges 12, 14, 16, and 18 is flush with the main surface 2S of the semiconductor substrate 2 around the grooves 11. More specifically, the mesa gauges 12, 14, 16, and 18 correspond to remaining parts after the multiple grooves 11 are formed in the main surface 2S of the semiconductor substrate 2 by dry etching, for example.

As illustrated in FIG. 3, the mesa gauges 12, 14, 16, and 18 of the detection portion 10 are disposed in correspondence with sides of a square. The mesa gauges 14 and 18 configuring an opposed pair of the sides are referred to as the first high-sensitive mesa gauge 14 and the second high-sensitive mesa gauge 18, respectively. The mesa gauges 12 and 16 configuring the other opposed pair of the sides are referred to as the first low-sensitive mesa gauge 12 and the second low-sensitive mesa gauge 16, respectively.

The first high-sensitive mesa gauge 14 and the second high-sensitive mesa gauge 18 extend in a <110> direction of the semiconductor substrate 2. Each of the first high-sensitive mesa gauge 14 and the second high-sensitive mesa gauge 18 extending in the <110> direction of the semiconductor substrate 2 is characterized by producing a large change of an electric resistance in accordance with compressive stress, i.e., a component exhibiting a piezoresistance effect.

The first low-sensitive mesa gauge 12 and the second low-sensitive mesa gauge 16 extends in a <100> direction of the second semiconductor substrate 2. Each of the first low-sensitive mesa gauge 12 and the second low-sensitive mesa gauge 16 extending in the <100> direction of the semiconductor substrate 2 is characterized by producing substantially no change of an electric resistance in accordance with compressive stress, that is, a component exhibiting substantially no piezoresistance effect.

As illustrated in FIG. 1 and FIG. 2, gauge portions 12a, 14a, 16a, and 18a, each of which contains p-type impurities, are formed on the surfaces of the mesa gauges 12, 14, 16, and 18, respectively. Each impurity concentration of the gauge portions 12a, 14a, 16a, and 18a is approximately in a range from $1 \times 10^{18}$ cm$^{-3}$ to $1 \times 10^{21}$ cm$^{-3}$. The gauge portions 12a, 14a, 16a, and 18a are brought into a substantially insulated state from the n-type semiconductor substrate 2 by pn junction.

As illustrated in FIG. 3, wiring portions 22, 24, 26, and 28, each of which contains p-type impurities, are disposed on the main surface 2S of the semiconductor substrate 2. Each impurity concentration of the wiring portions 22, 24, 26, and 28 is approximately in a range from $1 \times 10^{18}$ cm$^{-3}$ to $1 \times 10^{21}$ cm$^{-3}$. The wiring portions 22, 24, 26, and 28 electrically connect the detection portion 10 and electrodes 32, 34, 36, and 38, respectively. The electrodes 32, 34, 36, and 38 are provided on the main surface 2S of the semiconductor substrate 2, and disposed on an area out of a range covered by the force transmission block 4.

One end of the first wiring portion 22 is connected with a first connection portion 13 connecting the gauge portion 12a of the first low-sensitive mesa gauge 12 and the gauge portion 14a of the first high-sensitive mesa gauge 14. The other end of the first wiring portion 22 is connected with the first electrode 32. The first wiring portion 22 includes a first mesa lead 22a on the first connection portion 13 side of the mesa gauges 12 and 14. The first mesa lead 22a protrudes in a mesa shape from the bottom of the corresponding groove 11. The first mesa lead 22a is produced in the same step as the manufacturing step of the mesa gauges 12, 14, 16, and 18.

One end of the second wiring portion 24 is connected with a second connection portion 15 connecting the gauge portion 14a of the first high-sensitive mesa gauge 14 and the gauge portion 16a of the second high-sensitive mesa gauge 16. The other end of the second wiring portion 24 is connected with the second electrode 34. The second wiring portion 24 includes a second mesa lead 24a on the second connection portion 15 side of the mesa gauges 14 and 16. The second mesa lead 24a protrudes in a mesa shape from the bottom of the corresponding groove 11. The second mesa lead 24a is produced in the same step as the manufacturing step of the mesa gauges 12, 14, 16, and 18.

One end of the third wiring portion 26 is connected with a third connection portion 17 connecting the gauge portion 16a of the second low-sensitive mesa gauge 16 and the gauge portion 18a of the second high-sensitive mesa gauge 18. The other end of the third wiring portion 26 is connected with the third electrode 36. The third wiring portion 26 includes a third mesa lead 26a on the third connection portion 17 side of the mesa gauges 16 and 18. The third mesa lead 26a protrudes in a mesa shape from the bottom of the corresponding groove 11. The third mesa lead 26a is produced in the same step as the manufacturing step of the mesa gauges 12, 14, 16, and 18.

One end of the fourth wiring portion 28 is connected with a fourth connection portion 19 connecting the gauge portion 18a of the second high-sensitive mesa gauge 18 and the gauge portion 12a of the first low-sensitive mesa gauge 12. The other end of the fourth wiring portion 28 is connected with the fourth electrode 38. The fourth wiring portion 26 includes a fourth mesa lead 28a on the fourth connection portion 19 side of the mesa gauges 12 and 18. The fourth mesa lead 28a protrudes in a mesa shape from the bottom of the corresponding groove 11. The fourth mesa lead 28a is produced in the same step as the manufacturing step of the mesa gauges 12, 14, 16, and 18.

As illustrated in FIG. 1 and FIG. 2, the force transmission block 4 has a rectangular parallelepiped shape, and includes a silicon layer 4a and a silicon oxide layer 4b. The semiconductor substrate 2 and the force transmission block 4 are connected with each other by cold-solid phase welding. More specifically, the main surface 2S of the semiconductor substrate 2 and the surface of the silicon oxide layer 4b of the force transmission block 4 are activated by using argon ions. Thereafter, the main surface 2S of the semiconductor substrate 2 and the surface of the silicon oxide layer 4b of the force transmission block 4 are brought into contact with each other in ultra-high vacuum to connect both the surfaces.

As illustrated in FIG. 1 and FIG. 2, a part of the silicon oxide layer 4b in the force transmission block 4 is removed to form a groove 4c on a surface of the force transmission block 4 on the semiconductor substrate 2 side. The groove 4c thus formed divides the silicon oxide layer 4b of the force transmission block 4 into a sealing portion 40a and a pressing portion 40b. In addition, the groove 4c thus formed produces a sealed space 6 between the semiconductor substrate 2 and the force transmission block 4 as a space separated from the outside.

The sealing portion 40a of the force transmission block 4 is connected to the main surface 2S of the semiconductor substrate 2 around the entire circumference of the mesa gauges 12, 14, 16, and 18. The semiconductor substrate 2 includes a sealing portion 20 to which the sealing portion 40a is connected. The sealing portion 20 of the semiconductor substrate 2 and the sealing portion 40a of the force transmission block 4 are airtightly connected with each other.

Figure 4:
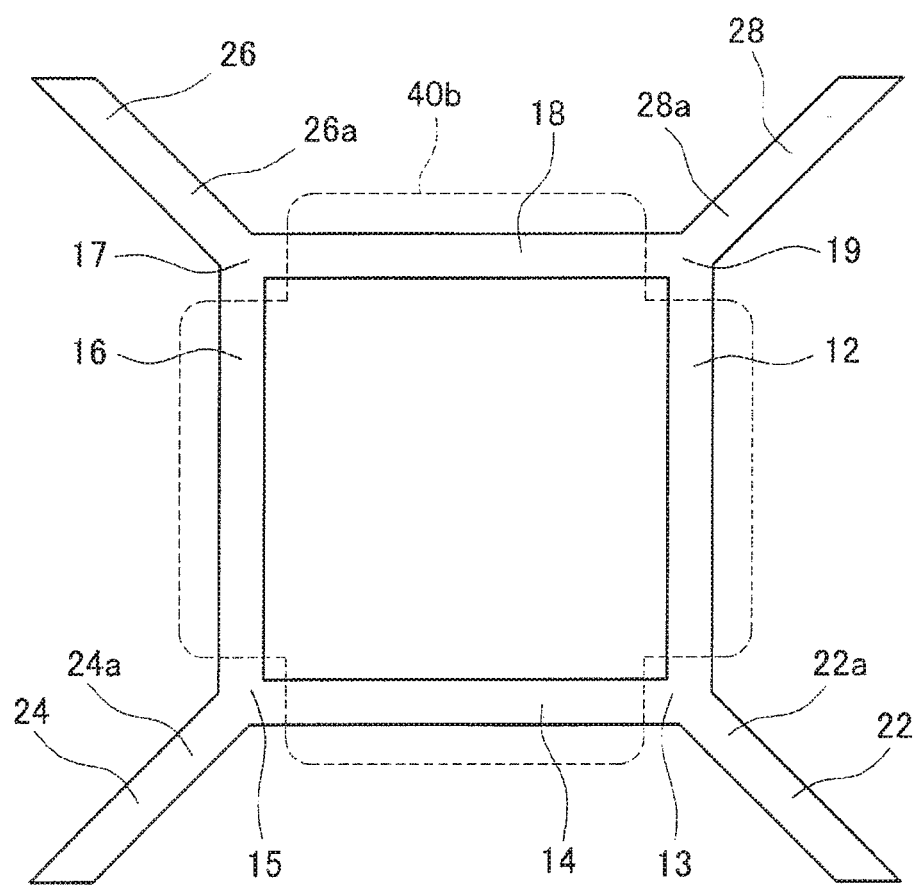
FIG. 4 is a diagram illustrating the force detection apparatus according to the example, schematically illustrating a positional relationship between a pressing portion of the force transmission block and a mesa gauge of the substrate.

FIG. 4 illustrates a positional relationship between the pressing portion 40b of the force transmission block 4 and the mesa gauges 12, 14, 16, and 18. The pressing portion 40b has a point symmetrical shape, and connects with a part of each top surface of the mesa gauges 12, 14, 16, and 18. The pressing portion 40b connects a major part of each top surface of the high-sensitive mesa gauges 14 and 18. The pressing portion 40b does not contact ends of each top surface of the high-sensitive mesa gauges 14 and 18 (top surface in the vicinity of the connection portions 13, 15, 17, and 19). The pressing portion 40b connects a major part of each top surface of the low-sensitive mesa gauges 12 and 16. The pressing portion 40b does not contact either ends of each top surface of the low-sensitive mesa gauges 12 and 16 (top surface in the vicinity of the connection portions 13, 15, 17, and 19). The pressing portion 40b does not contact each top surface of the mesa leads 22a, 24a, 26a, and 28a, and does not contact each top surface of the connection portions 13, 15, 17, and 19.

Operation of the force detection apparatus 1 will be hereinafter described. Initially, the force detection apparatus 1 during the use is brought into a state of connection between the first electrode 32 and a constant current source, grounding of the third electrode 36, and connection of a voltmeter between the second electrode 34 and the fourth electrode 38. In the force detection apparatus 1, compressive stress applied to the gauge portions 12a, 14a, 16a, and 18a of the mesa gauges 12, 14, 16, and 18 via the force transmission block 4 changes when a vessel internal pressure applied to the force transmission block 4 changes. Electric resistances of the gauge portions 14a and 18a of the high-sensitive mesa gauges 14 and 18 change in proportion to the compressive stress by the piezoresistance effect of the high-sensitive mesa gauges 14 and 18. In this case, a potential difference between the second electrode 34 and the fourth electrode 38 becomes proportional to the compressive stress applied to the gauge portions 14a and 18a. Accordingly, the vessel internal pressure applied to the force transmission block 4 is detectable based on a voltage change measured by the voltmeter.

In the force detection apparatus 1, the pressing portion 40b of the force transmission block 4 does not contact each top surface of the mesa leads 22a, 24a, 26a, and 28a. In this case, the vessel internal pressure applied to the force transmission block 4 is efficiently transmitted to the high-sensitive mesa gauges 14 and 18. Accordingly, sensor sensitivity of the force detection apparatus 1 improves.

According to the force detection apparatus 1 of this type, a voltage drop produced by parasitic resistances of the mesa leads 22a, 24a, 26a, and 28a deteriorates sensor sensitivity. Accordingly, it is preferable that the widths of the mesa leads 22a, 24a, 26a, and 28a of the force detection apparatus 1 (widths in directions parallel with the main surface 2S of the semiconductor substrate 2 and perpendicular to longitudinal directions of the mesa leads 22a, 24a, 26a, and 28a) are larger than the widths of the mesa gauges 12, 14, 16, and 18 (widths in directions parallel with the main surface 2S of the semiconductor substrate 2 and perpendicular to longitudinal directions of the mesa gauges 12, 14, 16, and 18). According to this structure, the parasitic resistances of the mesa leads 22a, 24a, 26a, and 28a decrease, and therefore sensor sensitivity of the force detection apparatus 1 improves.

Incidentally, in a case of a force transmission block which is in contact with each top surface of mesa leads as in a conventional force detection apparatus, a vessel internal pressure applied to the force transmission block is also transmitted to the mesa leads when the widths of the mesa leads are large. In this case, compressive stress applied to the high-sensitive mesa gauges decreases. Accordingly, even when parasitic resistances are reduced by increasing the widths of the mesa leads in the conventional force detection apparatus, sensor sensitivity is difficult to improve due to decrease in compressive stress applied to the high-sensitive mesa gauges. In the force detection apparatus 1 of the present example, the force transmission block 4 does not contact each top surface of the mesa leads 22a, 24a, 26a, and 28a. In this case, compressive stress applied to the high-sensitive mesa gauges 14 and 18 does not decrease even when the widths of the mesa leads 22a, 24a, 26a, and 28a are enlarged. Accordingly, sensor sensitivity of the force detection apparatus 1 of this example effectively improves with the large widths of the mesa leads 22a, 24a, 26a, and 28a.

A force detection apparatus according to a modified example and a comparison example will be hereinafter described. Configurations common to the corresponding configurations of the force detection apparatus 1 described above have been given common reference numbers, and the same explanation of the configurations is not repeated.

Figure 5:
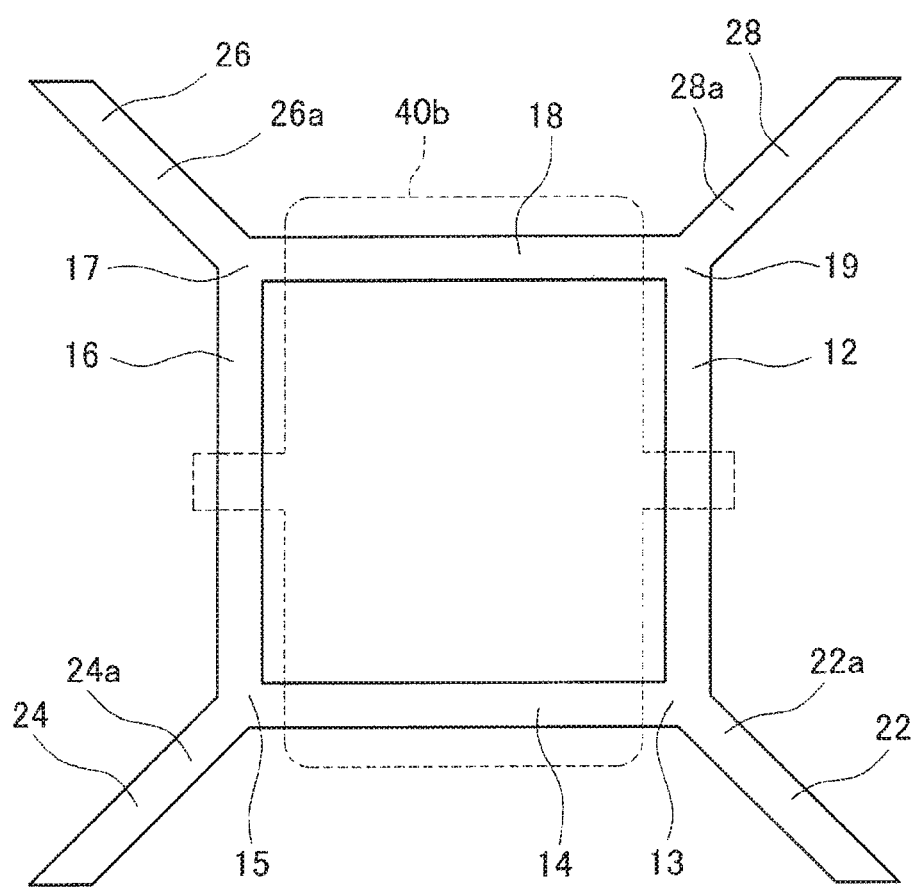
FIG. 5 is a diagram illustrating the force detection apparatus according to a modified example, schematically illustrating a positional relationship between a pressing portion of the force transmission block and a mesa gauge of the substrate.

According to the force detection apparatus of the modified example illustrated in FIG. 5, the pressing portion 40b of the force transmission block has a different layout between the high-sensitive mesa gauges 14 and 18 and the low-sensitive mesa gauges 12 and 16. The pressing portion 40b contacts a major part of each top surface of the high-sensitive mesa gauges 14 and 18, and therefore the contact area between the pressing portion 40b and the high-sensitive mesa gauges 14 and 18 is relatively large. The area occupied by the contact part of the top surfaces of the high-sensitive mesa gauges 14 and 18 contacting the pressing portion 40b in the total area of the entire top surfaces of the high-sensitive mesa gauges 14 and 18 is relatively large. The pressing portion 40b selectively contacts a part of each top surface of the low-sensitive mesa gauges 12 and 16 in the vicinity of the center thereof, and therefore the contact area between the pressing portion 40b and the low-sensitive mesa gauges 12 and 16 is relatively small. The area occupied by the contact part of the top surfaces of the low-sensitive mesa gauges 12 and 16 contacting the pressing portion 40b in the total area of entire top surfaces of the low-sensitive mesa gauges 12 and 16 is relatively small. As can be understood, the contact area of the pressing portion 40b in contact with each of the high-sensitive mesa gauges 14 and 18 is different from the contact area of the pressing portion 40b in contact with each of the low-sensitive mesa gauges 12 and 16 according to the force detection apparatus of this modified example. In this case, a vessel internal pressure applied to the force transmission block is efficiently transmitted to the high-sensitive mesa gauges 14 and 18. Accordingly, sensor sensitivity of the force detection apparatus of this modified example improves.

Figure 6:
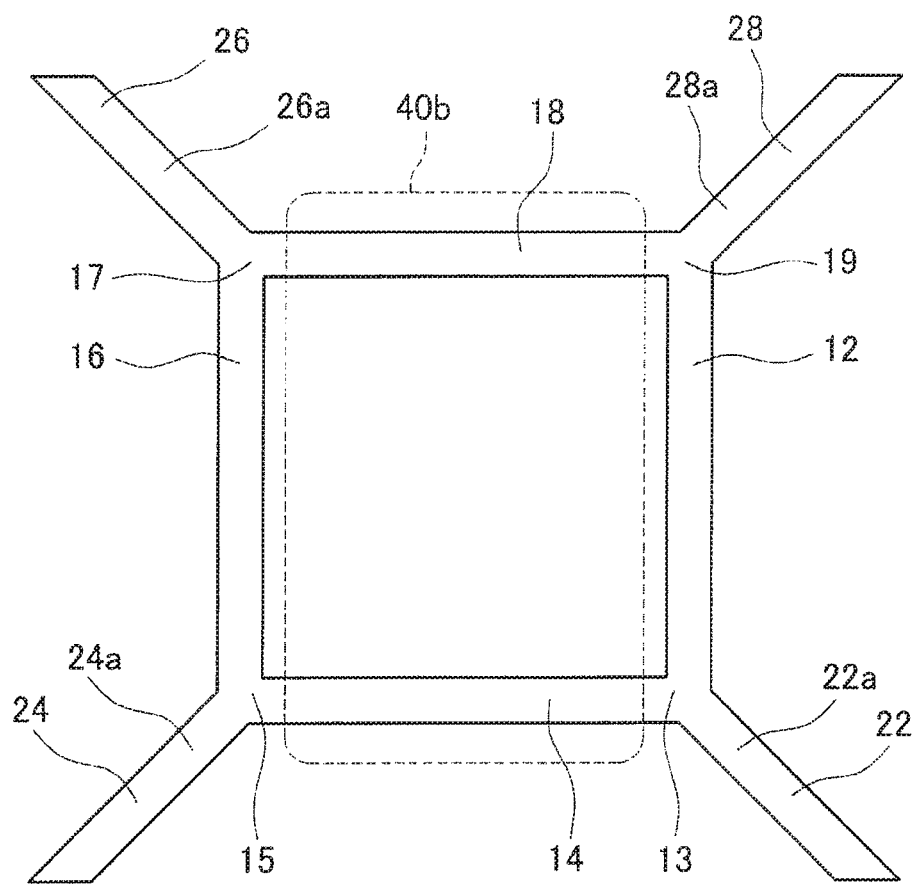
FIG. 6 is a diagram illustrating the force detection apparatus according to a comparison example, schematically illustrating a positional relationship between a pressing portion of the force transmission block and a mesa gauge of the substrate.

In order to explain other characteristics of the force detection apparatus of the modified example, a force detection apparatus of a comparison example will be described. According to the force detection apparatus of the comparison example illustrated in FIG. 6, the pressing portion 40b of the force transmission block only contacts the pair of high-sensitive mesa gauges 14 and 18. In case of this configuration, a vessel internal pressure applied to the force transmission block is efficiently transmitted to the high-sensitive mesa gauges 14 and 18.

Figure 7:
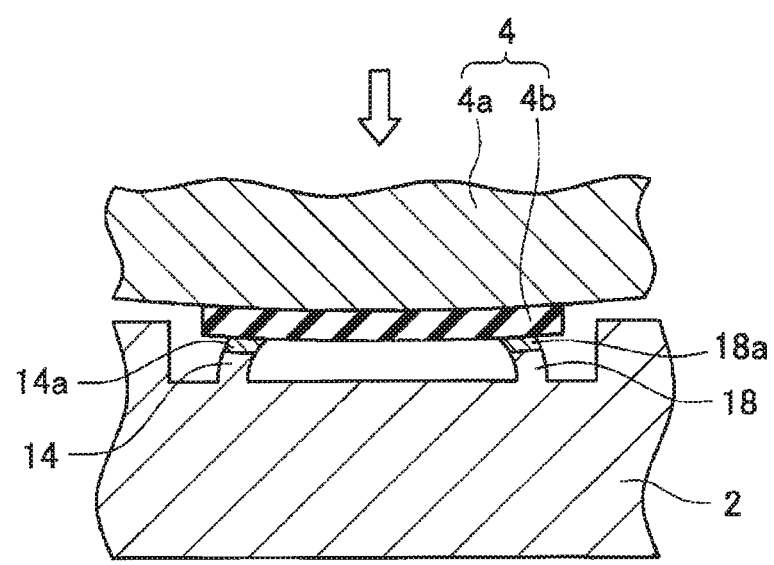
FIG. 7 is a diagram illustrating a schematic enlarged view of a force detection apparatus according to the comparison example, illustrating a condition of a high-sensitive mesa gauge when a force transmission block receives a pressure.

However, when a vessel internal pressure is applied to the force transmission block 4, an area surrounded by the mesa gauges bends toward the semiconductor device 2 so as to have a convex shape with the peak of the convex shape located at the center point of the bended area as illustrated in FIG. 7. This bend of the force transmission block 4 one-sidedly deforms the high-sensitive mesa gauges 14 and 18 toward the inside. As a result, linearity between compressive stress and electric resistances deteriorates.

According to the force detection apparatus of the modified example illustrated in FIG. 5, the pressing portion 40b of the force transmission block also contacts a part of each top surface of the low-sensitive mesa gauges 12 and 16. This structure reduces a bend of the force transmission block, thereby decreasing one-sided deformation of the high-sensitive mesa gauges 14 and 18. In this case, linearity between compressive stress and electric resistances improves in the force detection apparatus of the modified example. According to the force detection apparatus of the modified example, it may be possible to both obtain sensor sensitivity and linearity.

Figure 8:
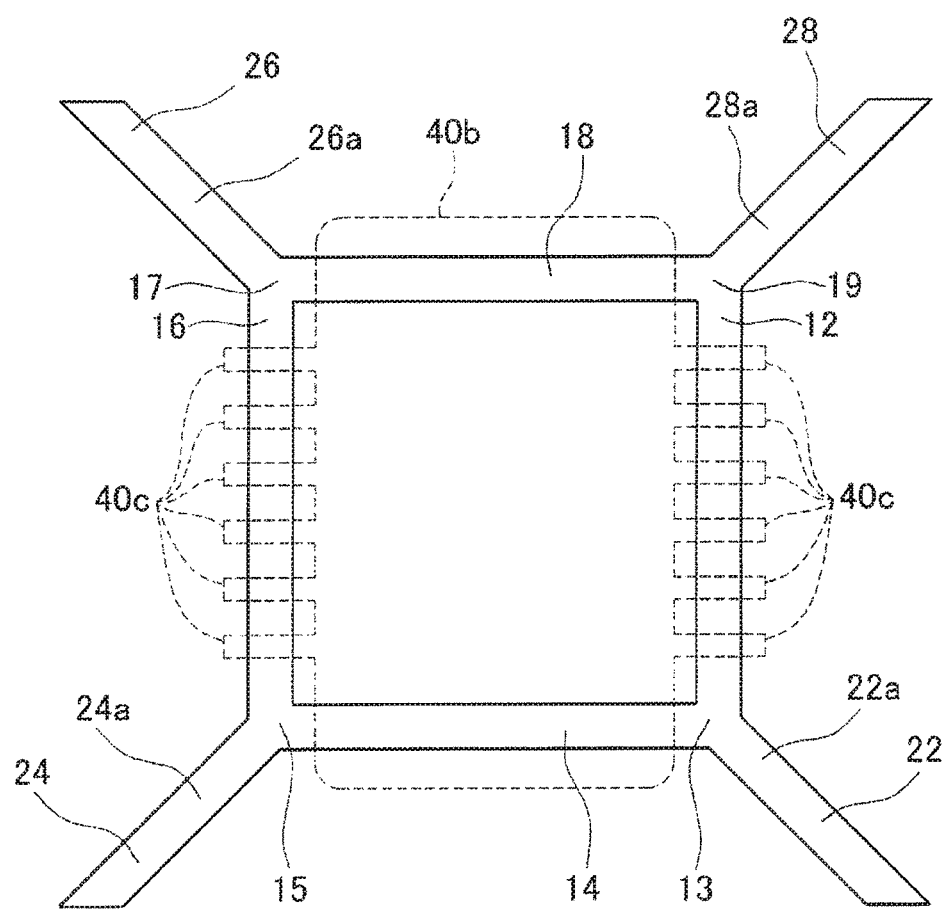
FIG. 8 is a diagram illustrating the force detection apparatus according to the modified example, schematically illustrating a positional relationship between the pressing portion of the force transmission block and the mesa gauge of the substrate.

According to a force detection apparatus of a modified example illustrated in FIG. 8, the pressing portion 40b of the force transmission block includes multiple plurality parts 40c that are located apart from each other in each longitudinal direction of the low-sensitive mesa gauges 12 and 16. Each of the plurality parts 40c contacts the corresponding top surface of the low-sensitive mesa gauges 12 and 16. The plurality parts 40c are disposed at equal intervals in each longitudinal direction of the low-sensitive mesa gauges 12 and 16. According to the force detection apparatus of this modified example, a bend of the force transmission block 4 decreases, and therefore linearity between compressive stress and electric resistances improves.

Figure 9:
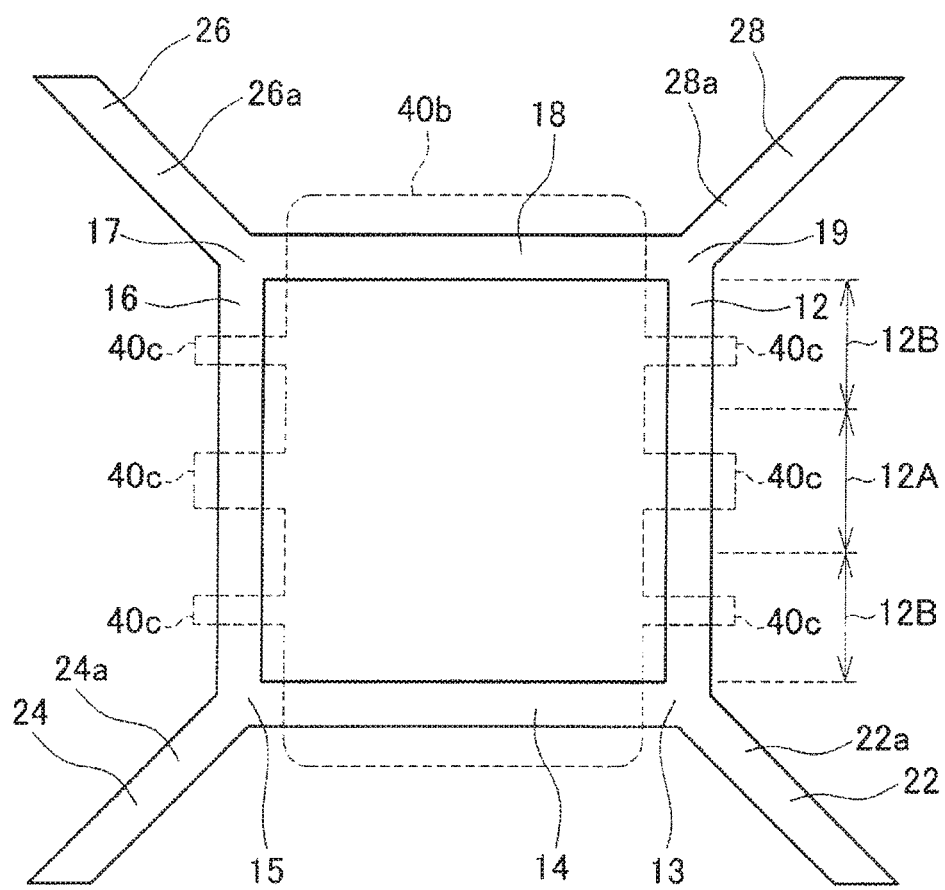
FIG. 9 is a diagram illustrating the force detection apparatus according to the modified example, schematically illustrating a positional relationship between the pressing portion of the force transmission block and the mesa gauge of the substrate.
Figure 10:
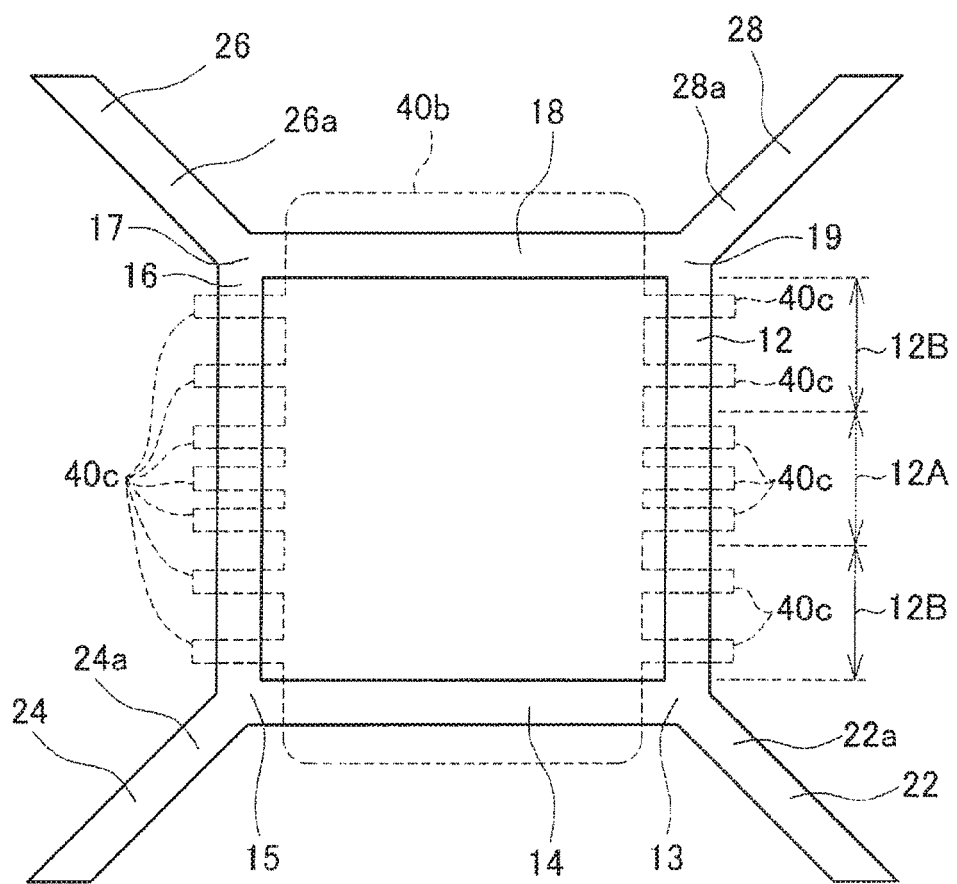
FIG. 10 is a diagram illustrating the force detection apparatus according to the modified example, schematically illustrating a positional relationship between the pressing portion of the force transmission block and the mesa gauge of the substrate.

A force detection apparatus according to modified examples illustrated in FIG. 9 and FIG. 10 will be hereinafter described. For easy understanding of characteristics of the force detection apparatus of the modified examples, each of the low-sensitive mesa gauges 12 and 16 is divided into three regions in the longitudinal direction in the following description as illustrated in FIG. 9 and FIG. 10. (For simplifying the depiction, only the regions corresponding to the first low-sensitive mesa gauge 12 are shown in the drawings. However, this configuration is similarly applicable to the second low-sensitive mesa gauge 16.) Each of the low-sensitive mesa gauges 12 and 16 includes a central region 12A and a pair of peripheral regions 12B. The central region 12A extends in the vicinity of the center of the mesa gauge in the longitudinal direction. Each of the pair of peripheral regions 12B extends in the longitudinal direction from the corresponding one of the connection portions 13, 15, 17 and 19 of the mesa gauges, and reaches the central region 12A. The length of the central region 12A in the longitudinal direction is equivalent to the length of each of the pair of peripheral regions 12B in the longitudinal direction. In other words, in three equal divisions of each of the low-sensitive mesa gauges 12 and 16 divided in the longitudinal direction, the central region 12A corresponds to the division positioned in the vicinity of the center, while each of the peripheral regions 12B corresponds to the division positioned in the periphery.

When a comparison is made between the central region 12A and the peripheral regions 12B of the force detection apparatus of the modified example illustrated in FIG. 9, the area of contact between the top surface of the central region 12A and the plurality parts 40c is larger than the area of contact between the top surface of one of the peripheral regions 12B and the plurality parts 40c. In other words, the area occupied by the contact part of the top surface of the central region 12A contacting the plurality parts 40c in the total area of the entire top surface of the central region 12A is larger than the area of the contact part of the top surface of one of the peripheral regions 12B contacting the plurality parts 40c in the total area of the entire top surface of one of the peripheral regions 12B. As described above, the force transmission block bends in such a manner that the peak of the convex shape is located at the center point of the force transmission block when a vessel internal pressure is applied to the force transmission block. The central region 12A of each of the low-sensitive mesa gauges 12 and 16 is disposed close to the center point of the force transmission block. According to this structure, the central region 12A comes into contact with a wide area of the force transmission block, and therefore the bend of the force transmission block effectively decreases. In other words, this structure effectively decreases the bend of the force transmission block while reducing enlargement of the contact area between the force transmission block and the low-sensitive mesa gauges 12 and 16. Accordingly, it may be possible to obtain sensor sensitivity and linearity in the force detection apparatus of this modified example. The plurality parts 40c corresponding to the peripheral regions 12B may be eliminated depending on required characteristics. This example corresponds to the force detection apparatus of the modified example illustrated in FIG. 5. Accordingly, the force detection apparatus of the modified example illustrated in FIG. 5 also becomes a device capable of effectively decreasing the bend of the force transmission block while reducing enlargement of the contact area between the force transmission block and the low-sensitive mesa gauges 12 and 16, that is, a device realizing improvement of both sensor sensitivity and linearity.

According to the force detection apparatus of the modified example illustrated in FIG. 10, the plurality parts 40c disposed in correspondence with the central part 12A are disposed at shorter intervals than the intervals of the plurality parts 40c disposed in correspondence with the peripheral regions 12B when a comparison is made between the central region 12A and the peripheral regions 12B. Similarly to the above example, the area occupied by the contact part of the top surface of the central region 12A contacting the plurality parts 40c in the total area of the entire top surface of the central region 12A becomes larger than the area occupied by the contact part of the one of the peripheral regions 12B contacting the plurality parts 40c in the total area of the entire top surface of one of the peripheral regions 12B in the force detection apparatus of this modified example. Accordingly, the force detection apparatus of this modified example also effectively reduces a bend of the force transmission block, thereby improving both sensitivity and linearity.

(Second Embodiment)

A force detection apparatus according to an embodiment disclosed in this description is a sensor which detects an air pressure. A detection target may be a combustion pressure, for example. The force detection apparatus may include a substrate and a force transmission block. It is preferable that the substrate is made of material which changes an electric resistance in accordance with compressive stress by a piezoresistance effect. For example, the substrate includes a semiconductor substrate and an SOI substrate. The substrate may include a mesa gauge, a sealing portion, and a support. The mesa gauge may be formed on a main surface of the substrate. The mesa gauge may contact the force transmission block, and forms a bridge circuit. The mesa gauge may have a mesa-shaped configuration. The top surface of the mesa gauge may contact the force transmission block. The sealing portion may be formed on the main surface, and contact the force transmission block around the entire circumference of the mesa gauge. The support may be formed on the main surface and disposed in an inner area surrounded by the mesa gauge, and may contact the force transmission block. The support may have a mesa-shaped configuration. The top surface of the support may contact the force transmission block. It is preferable that the rigidity of the support is higher than the rigidity of the mesa gauge.

According to this embodiment, a sealed space may be defined as a space airtightly separated from the outside by the substrate and the force transmission block. The sealed space may be disposed between the mesa gauge and the sealing portion, and have a thickness sufficient for producing a bend of the force transmission block.

The force transmission block of this embodiment may include a groove on a surface of the substrate side. The groove may be disposed between a portion in contact with the mesa gauge and another portion in contact with the sealing portion. This groove defines the sealed space.

According to this embodiment, the force transmission block may include a silicon layer and a silicon oxide layer. The silicon oxide layer may cover a part of the surface of the silicon layer on the substrate side. In this case, the groove may be formed in a non-covered area which is an area not covered by the silicon oxide layer. The groove defining the sealed space is easily formed by processing the silicon oxide layer in the force transmission block.

(Second Example)

Figure 11:
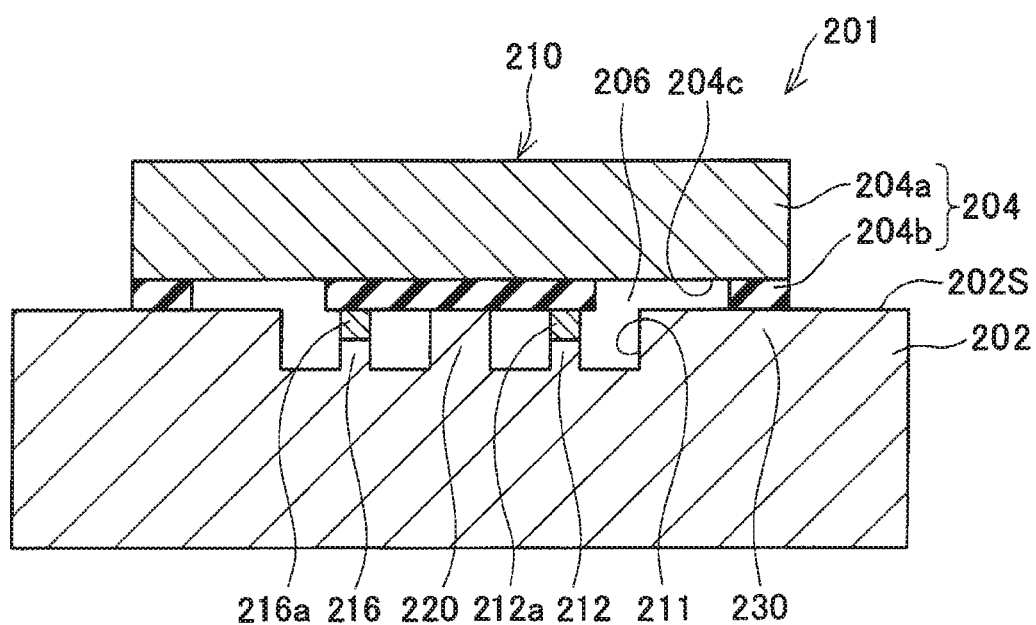
FIG. 11 is a diagram illustrating a schematic cross-sectional view of a force detection apparatus according to an example, taken along a line XI-XI in FIG. 12.
Figure 12:
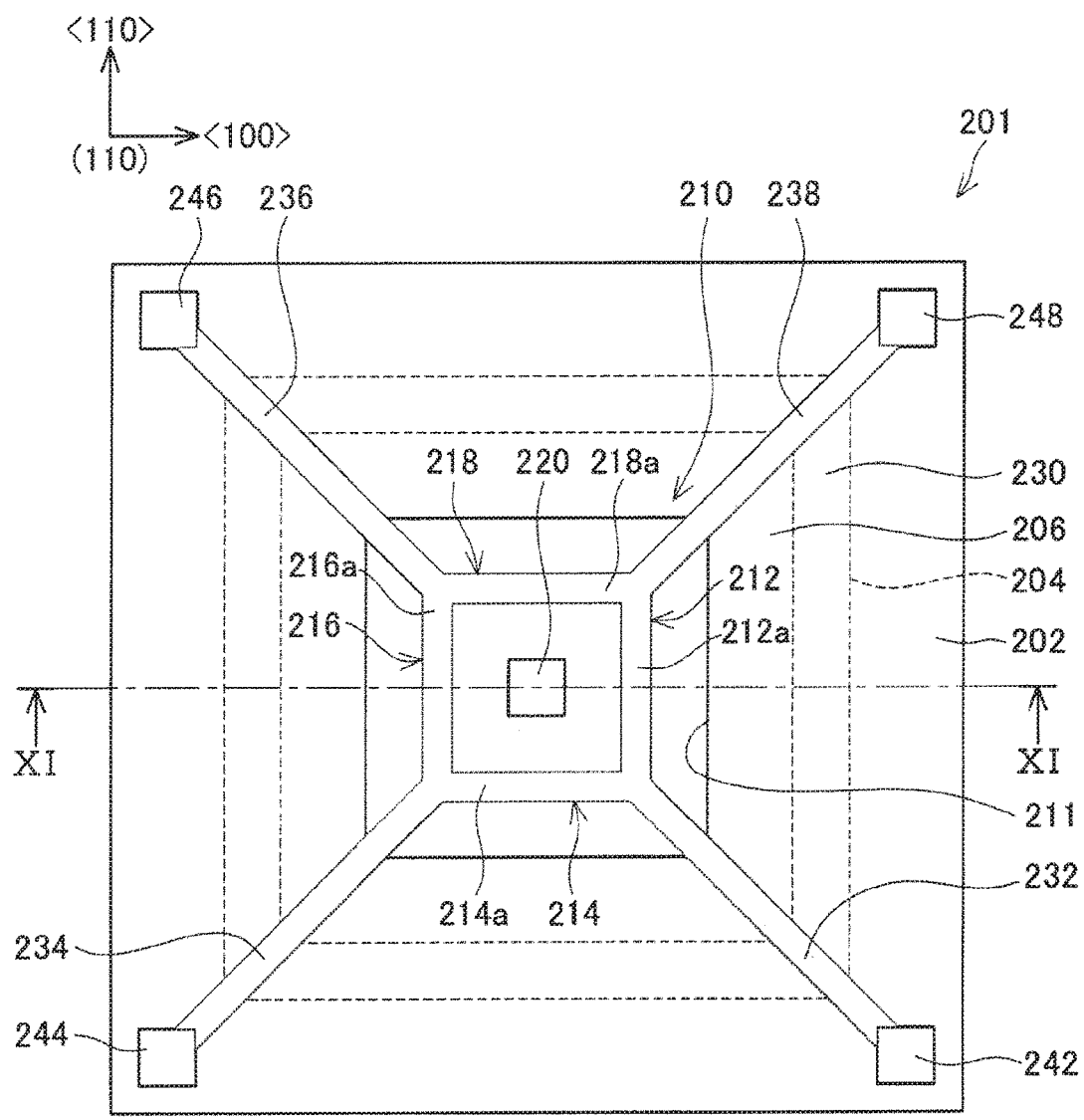
FIG. 12 is a diagram illustrating a schematic plan view of a substrate of the force detection apparatus according to the example.

As illustrated in FIG. 11 and FIG. 12, a force detection apparatus 201 is, for example, a semiconductor pressure sensor that detects a combustion pressure of an internal combustion engine, and includes a semiconductor substrate 202 and a force transmission block 204.

The semiconductor substrate 202 is made of n-type single crystal silicon, and includes a main surface 202S provided by a (110) crystal surface. Multiple grooves 211 are formed on the main surface 202S of the semiconductor substrate 202. The multiple grooves 211 define a detection portion 210, a support 220, and a sealing portion 230 on the main surface 202S of the semiconductor substrate 202.

As illustrated in FIG. 12, the detection portion 210 includes mesa gauges 212, 214, 216, and 218 configuring a bridge circuit. Each of the mesa gauges 212, 214, 216, and 218 protrudes in a mesa shape from the bottom of the corresponding groove 211. Each height of the mesa gauges 212, 214, 216, and 218 ranges approximately from 0.5 μm to 5 μm. Each top surface of the mesa gauges 212, 214, 216, and 218 is flush with the main surface 202S of the semiconductor substrate 202 around the grooves 211. More specifically, the mesa gauges 212, 214, 216, and 218 are remaining parts after the multiple grooves 211 are formed in the main surface 202S of the semiconductor substrate 202 by dry etching, for example.

As illustrated in FIG. 12, the first mesa gauge 212 and the third mesa gauge 216 of the detection portion 210 constitute an opposed pair of sides of a rectangle, while the second mesa gauge 214 and the fourth mesa gauge 218 constitute the other opposed pair of sides of the rectangular shape. The first mesa gauge 212 and the third mesa gauge 216 extend in a <110> direction of the semiconductor substrate 202. Each of the first mesa gauge 212 and the third mesa gauge 216 extending in the <110> direction of the semiconductor substrate 202 exhibits a piezoresistance effect which changes an electric resistance in accordance with compressive stress. The second mesa gauge 214 and the fourth mesa gauge 218 extend in a <100> direction of the semiconductor substrate 202. Each of the second mesa gauge 214 and the fourth mesa gauge 218 extending in the <100> direction of the semiconductor substrate 202 exhibits substantially no piezoresistance effect.

As illustrated in FIG. 11 and FIG. 12, gauge portions 212a, 214a, 216a, and 218a, each of which contains p-type impurities, are formed on the surfaces of the mesa gauges 212, 214, 216, and 218, respectively. Each impurity concentration of the gauge portions 212a, 214a, 216a, and 218a is approximately in a range from $1\times10^{18}$ cm$^{-3}$ to $1\times10^{21}$ cm$^{-3}$. The gauge portions 212a, 214a, 216a, and 218a are brought into a substantially insulated state from the n-type semiconductor substrate 202 by pn junction.

As illustrated in FIG. 11 and FIG. 12, the support 220 is disposed in an inner area surrounded by the mesa gauges 212, 214, 216, and 218. The support 220 protrudes in a mesa shape from the bottoms of the grooves 211. The support 220 has a height approximately in a range from 0.5 μm to 5 μm. The top surface of the support 220 is flush with the main surface 202S of the semiconductor substrate 202 around the grooves 211. More specifically, the support 220 is a remaining part after the multiple grooves 211 are formed in the main surface 202S of the semiconductor substrate 202 by dry etching, for example. The support 220 has a configuration similar to the rectangular shape formed by the mesa gauges 212, 214, 216, and 218 in the plan view. The side length of the support 220 is larger than each width of the mesa gauges 212, 214, 216, and 218 (width in direction perpendicular to longitudinal direction). Accordingly, the rigidity of the support 220 is higher than the rigidity of the mesa gauges 212, 214, 216, and 218.

As illustrated in FIG. 12, wiring portions 232, 234, 236, and 238, each of which contains p-type impurities, are disposed on the main surface 202S of the semiconductor substrate 202. Each impurity concentration of the wiring portions 232, 234, 236, and 238 is approximately in a range from $1\times10^{18}$ cm$^{-3}$ to $1\times10^{21}$ cm$^{-3}$. One end of the first wiring portion 232 is connected with a connection portion connecting a first gauge portion 212a and a second gauge portion 214a. The other end of the first wiring portion 232 is connected with a first electrode 242. One end of the second wiring portion 234 is connected with a connection portion connecting the second gauge portion 214a and a third gauge portion 216a. The other end of the second wiring portion 234 is connected with a second electrode 244. One end of the third wiring portion 236 is connected with a connection portion connecting the third gauge portion 216a and a fourth gauge portion 218a. The other end of the third wiring portion 236 is connected with a third electrode 246. One end of the fourth wiring portion 238 is connected with a connection portion connecting the fourth gauge portion 218a and the first gauge portion 212a. The other end of the fourth wiring portion 238 is connected with a fourth electrode 248. Each of the electrodes 242, 244, 246, and 248 is provided on the main surface 202S of the semiconductor substrate 202, and disposed in an area out of a range covered by the force transmission block 204.

As illustrated in FIG. 11, the force transmission block 204 has a rectangular parallelepiped shape, and includes a silicon layer 204a and a silicon oxide layer 204b. The silicon oxide layer 204b covers a part of surface of the silicon layer 204a on the semiconductor substrate 202 side. The force transmission block 204 is connected to the main surface 202S of the semiconductor substrate 202 around the entire circumference of the mesa gauges 212, 214, 216, and 218. The semiconductor substrate 202 includes a sealing portion 230 to which the force transmission block 204 is connected. The sealing portion 230 of the semiconductor substrate 202 and the force transmission block 204 are airtightly connected with each other. The force transmission block 204 is further connected to the top surfaces of the mesa gauges 212, 214, 216, and 218, and the top surface of the support 220. The semiconductor substrate 202 and the force transmission block 204 are connected with each other by cold-solid phase welding. More specifically, the main surface 202S of the semiconductor substrate 202 and the surface of the silicon oxide layer 204b of the force transmission block 204 are activated by using argon ions. Thereafter, the main surface 202S of the semiconductor substrate 202 and the surface of the silicon oxide layer 204b of the force transmission block 204 are brought into contact with each other in ultra-high vacuum to connect both the surfaces.

As illustrated in FIG. 11, a part of the silicon oxide layer 204b of the force transmission block 204 is removed to form a groove 204c on the surface of the force transmission block 204 on the semiconductor substrate 202 side. The groove 204c is disposed in such a position as to face an area between the mesa gauges 212, 214, 216, and 218 of the semiconductor substrate 202 and the sealing portion 230. The groove 204c surrounds the entire circumference of the mesa gauges 212, 214, 216, and 218 in the plan view of the force detection apparatus 201. The groove 204c thus formed defines a sealed space 206 between the semiconductor substrate 202 and the force transmission block 204 as a space separated from the outside.

Operation of the force detection apparatus 201 will be described. Initially, the force detection apparatus 201 during the use is brought into a state of connection between the first electrode 242 and a constant current source, grounding of the third electrode 246, and connection of a voltmeter between the second electrode 244 and the fourth electrode 248. According to the force detection apparatus 201, compressive stress applied to the gauge portions 212a, 214a, 216a, and 218a of the mesa gauges 212, 214, 216, and 218 via the force transmission block 204 changes when a combustion pressure applied to the force transmission block 204 changes. Electric resistances of the gauge portions 212a and 216a change in proportion to the compressive stress by a piezoresistance effect of the gauge portions 212a and 216a. In this case, a potential difference between the second electrode 244 and the fourth electrode 248 becomes proportional to the compressive stress applied to the gauge portions 212a and 216a. Accordingly, the combustion pressure applied to the force transmission block 204 is detectable based on a voltage change measured by the voltmeter.

Figure 13:
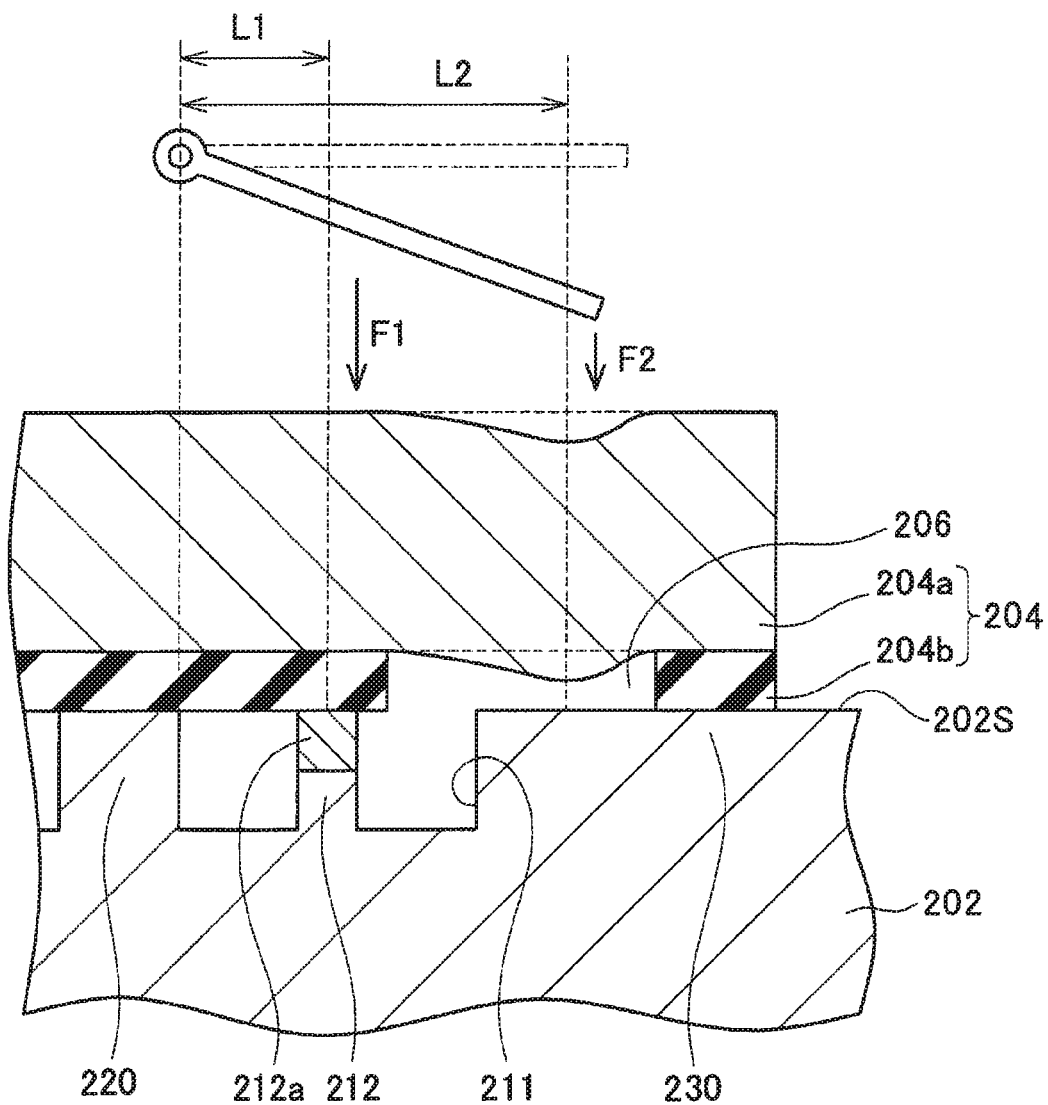
FIG. 13 is a diagram illustrating an enlarged cross-sectional view of the force detection apparatus according to the example, illustrating a main part in the vicinity of a sealed space, and explaining leverage operation.

As illustrated in FIG. 13, the sealed force detection apparatus 201 includes the sealed space 206 between the semiconductor substrate 202 and the force transmission block 204. The sealed space 206 is separated from the outside by airtight connection between the sealing portion 230 of the semiconductor substrate 202 and the force transmission block 204. In this case, a pressure difference between the internal air pressure of the sealed space 206 and the combustion pressure increases as the combustion pressure increases in the sealed force detection apparatus 201. Accordingly, force F2 corresponding to the sum of the combustion pressure applied to a pressure receiving area of the force transmission block 204 (corresponding to the area between the mesa gauges 212, 214, 216, and 218 and sealing portion 230 in the plan view of the force detection apparatus 201) bends the force transmission block 204 toward the sealed space 206. This condition produces a leverage relationship which defines the bended and deformed portion of the force transmission block 204 as the point of power, the support 220 as the fulcrum, and the mesa gauge 212 as the point of action. Assuming that the distance between the fulcrum of the support 220 and the point of action of the mesa gauge 212 is a distance L1, and that the distance between the fulcrum of the support 220 and the point of power of the deformed portion is a distance L2, force F1 applied to the point of action is expressed by the following expression 1 under a condition producing an ideal leverage effect.

$$F1 = F2 \cdot \frac{L2}{L1} \quad (1)$$

As described above, the sealed force detection apparatus 201 in this example is configured to exhibit a leverage relationship. In this case, the force F2 applied to the force transmission block 204 is amplified into the force F1, and the force F1 is applied to the mesa gauges 212 and 216 as amplified force. Accordingly, sensor sensitivity of the force detection apparatus 201 considerably improves.

For improving sensor sensitivity of the force detection apparatus 201 as expressed in Expression 1, it is preferable that the value L2/L1 becomes large, more specifically, 2 or larger.

Figure 14:
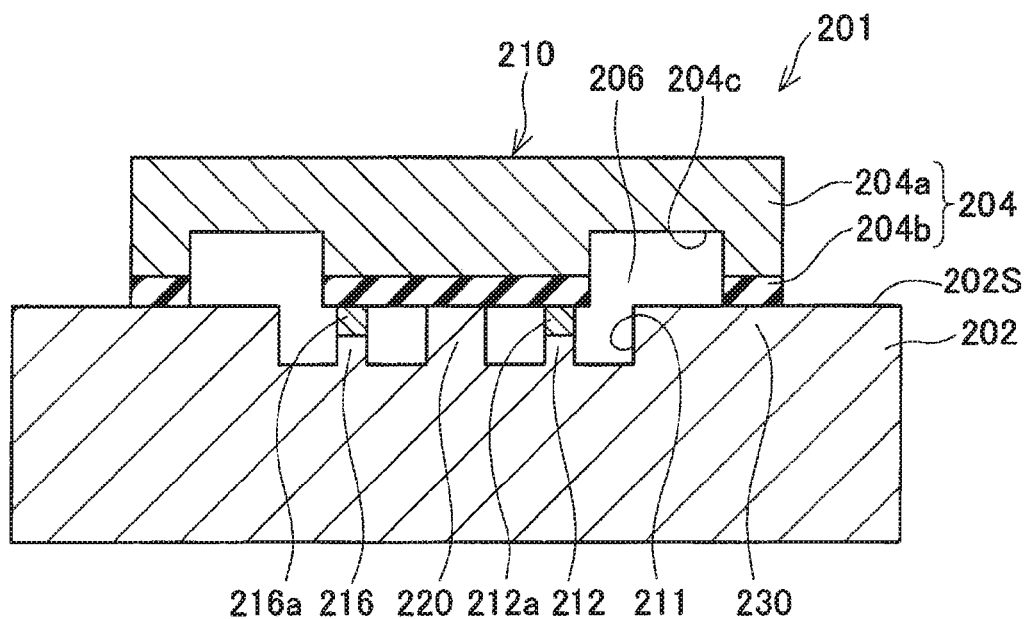
FIG. 14 is a diagram illustrating a schematic cross-sectional view of the force detection apparatus according to a modified example, corresponding to FIG. 11.

As illustrated in FIG. 14, both the silicon oxide layer 204b and the silicon layer 204a may be processed to form the groove 204c defining the sealed space 206. For producing a leverage effect, the force transmission block 204 needs to bend at a position corresponding to the sealed space 206. When the thickness of the silicon layer 204a at the position corresponding to the sealed space 206 is reduced as illustrated in FIG. 14, the corresponding portion of the silicon layer 204a bends in a preferable condition. Accordingly, a more preferable leverage effect is achievable.

Figure 15:
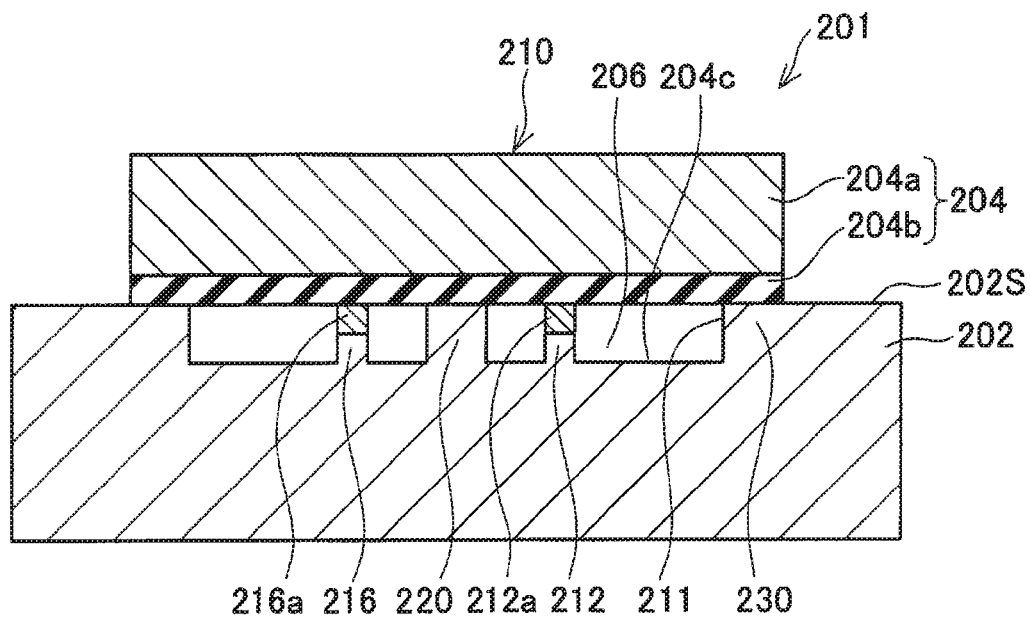
FIG. 15 is a diagram illustrating a schematic cross-sectional view of the force detection apparatus according to a modified example, corresponding to FIG. 11.

As illustrated in FIG. 15, the main surface 202S of the semiconductor substrate 202 may be processed to produce the groove 204c defining the sealed space 206. The groove 204c of this example may be produced in the same step as the manufacturing step of the mesa gauges 212, 214, 216, and 218, and the support 220 by dry etching.

Each of the semiconductor substrates 2 and 202 corresponds to an example of a substrate according to the present disclosure.

While specific examples of the present disclosure have been explained in detail, they are just examples. It should be noted that they does not limit embodiments, configuration, and modes according to the present disclosure. Art relating the present disclosure includes a thing obtained by modification or change of the exemplified specific examples in various ways. Further, technique elements explained in the description or the drawings show a technical utility by alone or various combinations, and it is not limited to a combination described in claims at the application. Further, a technique exemplified in the present description or the drawings may concurrently obtain multiple purposes, and a technical utility is realized by achieving one of the purposes itself.

The invention claimed is:

1. A force detection apparatus comprising:
   a substrate including a main surface; and
   a force transmission block,
   wherein:
   the substrate includes
      a high-sensitive mesa gauge that is provided on the main surface, extends in a first direction to produce a relatively large change of an electric resistance in accordance with compressive stress, and includes a top surface,
      a low-sensitive mesa gauge that is provided on the main surface, extends in a second direction to produce a relatively small change of an electric resistance in accordance with compressive stress, and includes a top surface, and
      a mesa lead that is provided on the main surface, extends in a third direction from a connection portion connecting the high-sensitive mesa gauge and the low-sensitive mesa gauge, and includes a top surface;
   the force transmission block contacts the top surface of the high-sensitive mesa gauge and the top surface of the low-sensitive mesa gauge, and is in non-contact with at least a part of the top surface of the mesa lead; and an area of contact between the force transmission block and the top surface of the high-sensitive mesa gauge is larger than an area of contact between the force transmission block and the low-sensitive mesa gauge.

2. The force detection apparatus according to claim 1, wherein:
the force transmission block is in non-contact with all the top surface of the mesa lead.

3. The force detection apparatus according to claim 1, wherein:
the force transmission block includes a plurality of plurality parts disposed away from each other in the second direction; and
each of the plurality parts contacts the top surface of the low-sensitive mesa gauge.

4. The force detection apparatus according to claim 3, wherein:
the low-sensitive mesa gauge includes
a central region extending in the second direction near a center of the low-sensitive mesa gauge, and
a peripheral region extending in the second direction from the connection portion toward the central region; and
an area of contact between the plurality parts and the central region is larger than an area of contact between the plurality parts and the peripheral region.

5. The force detection apparatus according to claim 4, wherein:
the low-sensitive mesa gauge includes
a central region extending in the second direction near a center of the low-sensitive mesa gauge, and
a peripheral region extending in the second direction from the connection portion toward the central region; and
the plurality parts that are disposed in correspondence with the central region are provided at shorter intervals than intervals of the plurality parts disposed in correspondence with the peripheral region.

6. A force detection apparatus comprising:
a substrate including a main surface; and
a force transmission block,
wherein:
the substrate includes
a high-sensitive mesa gauge that is provided on the main surface, extends in a first direction to produce a relatively large change of an electric resistance in accordance with compressive stress, and includes a top surface,
a low-sensitive mesa gauge that is provided on the main surface, extends in a second direction to produce a relatively small change of an electric resistance in accordance with compressive stress, and includes a top surface, and
a mesa lead that is provided on the main surface, extends in a third direction from a connection portion connecting the high-sensitive mesa gauge and the low-sensitive mesa gauge, and includes a top surface;
the force transmission block only contacts the top surface of the high-sensitive mesa gauge, and is in non-contact with the low-sensitive mesa gauge; and
an area of contact between the force transmission block and the top surface of the high-sensitive mesa gauge is larger than an area of contact between the force transmission block and the low-sensitive mesa gauge.

7. A force detection apparatus comprising:
a substrate including a main surface; and
a force transmission block,
wherein:
the substrate includes
a mesa gauge that is provided on the main surface, contacts the force transmission block, and configures a bridge circuit,
a sealing portion that is provided on the main surface and contacts the force transmission block around an entire circumference of the mesa gauge, and
a support that is provided on the main surface, disposed in an inner area surrounded by the mesa gauge, and contacts the force transmission block; and
the support directly contacts the force transmission block.

8. A force detection apparatus comprising:
a substrate including a main surface;
a force transmission block; and
a sealed space,
wherein:
the substrate includes
a mesa gauge that is provided on the main surface, contacts the force transmission block, and configures a bridge circuit,
a sealing portion that is provided on the main surface and contacts the force transmission block around an entire circumference of the mesa gauge, and
a support that is provided on the main surface, disposed in an inner area surrounded by the mesa gauge, and contacts the force transmission block;
the sealed space is positioned between the mesa gauge and the sealing portion, the sealed space being airtightly separated from an outside by the substrate and the force transmission block; and
when the force transmission block corresponding to the sealed space bends toward the sealed space, a portion where the force transmission block has been bended defines a point of power and the support defines a fulcrum and the mesa gauge defines a point of action, providing a leverage relationship.

* * * * *